UNITED STATES PATENT OFFICE 2,376,396

CHEMICAL PROCESS AND PRODUCT

Frank J. Soday, Swarthmore, Pa., assignor to The United Gas Improvement Company, a corporation of Pennsylvania No Drawing. Application June 23, 1941, Serial No. 399,431

18 Claims. (Cl. 106—180)

The present invention relates to new compositions of matter and to methods for their preparation.

More particularly, this invention pertains to isoprene diesters and to methods for the preparation of these isoprene derivatives.

This invention is based upon the discovery that isoprene diesters having the general formula

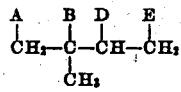

in which one of a pair consisting of A and B is an OOC—$R_1$ group and one of a pair consisting of D and E is an OOC—$R_2$ group, in which $R_1$ and $R_2$ each represent hydrogen or an alkyl, aryl, alkyl-aryl, or aryl-alkyl group, or derivatives or substituents thereof, which may be alike or different in nature, the remaining substituents being hydrogen atoms, may be prepared through the reaction of the corresponding isoprene derivative containing two atoms or groups capable of being replaced with groups of the type described, with an acid, an acyl halide, a metallic salt of an acid, or other suitable derivatives or substituents thereof.

It is an object of the present invention to provide new compositions of matter, namely, isoprene diesters and a process for the preparation thereof. Another object of this invention is to provide new compounds having utility in a number of chemical and related industries. More specifically, it is an object of this invention to provide isoprene derivatives which may be used as solvents and/or plasticizing agents for paints, lacquers, varnishes, enamels or similar coating compositions, and for other purposes for which solvents of this type are commonly employed. Another specific object of this invention is to provide compounds which may be used as intermediates in chemical syntheses. Other objects and advantages of the invention will be apparent to those skilled in the art from the following description.

Isoprene, having the general formula

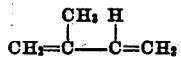

is the basic component in the preparation of these new compositions of matter. It may be obtained from various sources, such as synthetically, from the pyrogenic decomposition of rubber, or from fractions obtained upon the fractionation of condensates obtained in the manufacture of carburetted water gas, oil gas, refinery gas, or coke or oven gas, or from similar sources. Such fractions will be referred to herein, generally, as light oil isoprene fractions. Isoprene fractions obtained in the manufacture of oil gas are particularly preferred.

Hydrocarbon fractions containing from 5 to 100% of isoprene may be successfully used in the production of the herein described isoprene derivatives, although in general the use of fractions containing from 30 to 100% isoprene is preferred.

In general, the processes which have been developed for the production of isoprene diesters of the type described herein comprise the reaction of an isoprene derivative containing two groups capable of being replaced with —OOC—R groups, such as an isoprene dihydrohalide or isoprene glycol, or an isoprene haloalcohol containing a halogen substituent and a hydroxyl substituent, with an acid, or mixture of acids, or derivatives or substituents thereof, under conditions designed to introduce the —OOC—R groups into the isoprene molecule.

Thus, for example, an isoprene dihydrohalide may be reacted with a metallic derivative of the desired acid to give an isoprene diester. In a similar manner, isoprene glycol, may be reacted with an acid, or an anhydride or an acid chloride of the desired acid.

Almost any desired organic carboxylic acid may be used for the production of isoprene diesters of the type described herein, including aliphatic acids such as formic acetic, propionic, butyric, isobutyric, valeric, isovaleric, caproic, and similar acids; unsaturated acids such as acrylic and crotonic acids; substituted acids such as chloroacetic, glycine, glycollic, and lactic acids; dibasic acids such as maleic acid and derivatives thereof; aromatic acids, such as benzoic, salicylic, terephthalic, and phenyl acetic acids; naphthenic acids such as tetrahydrophthalic acid, methyl tetrahydrophthalic acid and the like; and derivatives and substituents thereof.

While the invention is designed to include the preparation of isoprene diesters of the type described from the dihydrohalides of isoprene in general, the dihydrobromides and, more particularly, the dihydrochlorides, comprise the preferred compounds due, among other things, to the ready availability and low cost of the agents required for their production. The large scale preparation of the dihydroiodides and dihydrofluorides of isoprene usually involves the use of special techniques, and usually results in fairly low yields of the desired compound or compounds unless special precautions are observed.

A preferred embodiment of this invention is the preparation of isoprene diesters of the type described from isoprene dihydrochloride.

Isoprene dihydrohalides may be prepared in a number of ways, as more fully described in my copending patent application, Serial Number 399,428 filed June 23, 1941.

Thus, for example, liquid or gaseous hydrogen halide may be introuced into isoprene, or into an isoprene fraction, say by means of a porous tube, or a pipe containing a porous cap, or otherwise.

On the other hand, liquid or gaseous hydrogen halide may be contacted with liquid or gaseous isoprene, or an isoprene fraction, in a kettle or other vessel, or in an open or packed tower, or in a pipe or other unit preferably possessing a small cross-sectional area, or otherwise.

The reactants may be contacted in any desired manner, for instance concurrently, or countercurrently, or in a static system.

I prefer to employ hydrogen chloride as the hydrogen halide. However, other hydrogen halides, such as hydrogen bromide, may be employed without departing from the spirit of the invention.

When a hydrogen halide, for example, hydrogen chloride, is added to isoprene, it is thought that the following initial reaction may take place.

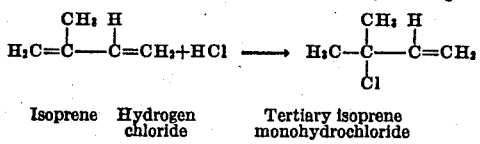

Isoprene   Hydrogen     Tertiary isoprene
           chloride     monohydrochloride The tertiary chloride thus formed, namely, 2-methyl-2-chlorobutene-3, may change either wholly or in part, on standing to a primary chloride, namely, 2-methyl-4-chlorobutene-2, having the following formula:

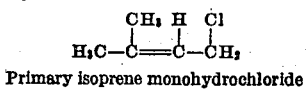

Primary isoprene monohydrochloride

However, there is some evidence that in the case of the chloride as distinguished from the bromide, that this rearrangement does not take place in large part, if at all.

Isoprene monohydrohalides may be prepared in the following manner.

Example 1

An isoprene fraction containing 70% by weight of isoprene was obtained by the fractionation of condensate obtained in the manufacture of oil gas.

This fraction also contained some olefines boiling in the same range and possibly some piperylene and cyclopentadiene. Isoprene fractions of lower concentration may contain considerable quantities of these materials.

A quantity equivalent to approximately 476 parts by weight of this fraction was cooled to approximately 0° C., whereupon a stream of dry hydrogen chloride was introduced into the isoprene fraction over a period of 10 hours, the temperature being maintained at approximately 0° C. throughout the entire time.

The mixture was then allowed to stand overnight and was then distilled.

That portion of the distillate boiling within the range of 30 to 33° C. at 40 mm. pressure, absolute, was collected as isoprene monohydrochloride.

That portion of the distillate boiling below 90° C. at atmospheric pressure and comprising for the most part unchanged isoprene, was retreated and distilled in the same manner. The distillate collected between 90 and 110° C. at atmospheric pressure was combined with the first distillate.

There was thus obtained a quantity of isoprene monohydrochloride equivalent to approximately 370 parts by weight. This fraction of isoprene monohydrochloride had the following properties:

Density $(d\ 20°/4°) = 0.9218$
Refractive index $(n\ 20°/D) = 1.43975$

A quantity equivalent to approximately 260 parts by weight of hydrogen chloride was absorbed. This corresponds with the theoretical quantity required to add hydrogen chloride to one of the double bonds of the isoprene contained in the given quantity of starting material.

The preparation of isoprene monohydrohalide in the above manner may be carried out at any suitable temperature.

Temperatures between −60 and 36° C. may be employed for the production of isoprene monohydrohalides in the liquid phase, isoprene boiling at the upper temperature limit indicated.

On the other hand, if desired, the reaction may be carried out in the vapor phase by employing temperatures above 36° C. or pressures below atmospheric, or in liquid phase with superatmospheric pressures, although there are limiting factors such as the tendency of isoprene to polymerize at elevated temperatures in the presence of an acid catalyst.

In general, it is preferred to carry out the reaction in the liquid phase, while employing temperatures between −60° and 10° C.

If desired, halogenating catalysts may be employed to accelerate the addition of hydrogen halide to the isoprene molecule. Examples of halogenating catalysts are methyl alcohol, acetone, and certain metallic halides.

The isoprene monohydrohalide thus obtained, namely the distillate boiling between 90° C. and 110° C. at atmospheric pressure, or, if desired, the crude reaction product prior to distillation, or any fraction thereof, whether narrower or wider than the above fraction, may be employed in the preparation of isoprene dihydrohalides.

The addition of the second molecule of hydrogen halide to isoprene is attended with considerable difficulty, particularly when the reaction is carried out in the liquid phase at normal or reduced temperatures.

As pointed out in the copending patent application previously referred to, the second molecule of hydrogen chloride may be added to isoprene monohydrochloride at ordinary or reduced temperatures in the liquid phase by conducting the reaction in the presence of aqueous hydrochloric acid. Although any desired quantity of aqueous hydrochloric acid may be used, excellent results are obtained when at least 15% and preferably 20%, or more, of aqueous hydrochloric acid, based on the weight of the isoprene monohydrochloride present, is employed.

This process is illustrated by the following example.

Example 2

A mixture of 522 grams (5 moles) of isoprene monohydrochloride and 500 grams of concentrated aqueous hydrochloric acid was cooled to 0° C., after which a stream of anhydrous hydrogen chloride was passed into the mixture for a period of 7 hours. A total of five moles of hydrogen chloride was absorbed during this period. The crude isoprene dihydrochloride was separated from the aqueous hydrochloric acid layer, dried over anhydrous sodium sulfate, and distilled under reduced pressure. A total of 619 grams of isoprene dihydrochloride having the following physical properties was obtained.

Boiling range 34–40° C. @ 10–12 mm.
  144–148° C. @ 760 mm. (with slight decomposition)
Density ($d\ 20°/4$) = 1.0679
Refractive index ($n\ 20°/d$) = 1.44549

It is, of course, to be understood that the foregoing method represents only one manner in which the isoprene dihydrohalides may be prepared. As pointed out previously, the addition of hydrogen halide may be carried out in the liquid or gaseous phase, at normal, elevated or reduced pressures, and at normal, elevated, or reduced temperatures.

In addition, the foregoing experiments were carried out in two stages in order to indicate the reaction mechanism involved. In actual practice, the reaction undoubtedly would be carried out in only one stage in most cases. This is illustrated by means of the following experiment.

Example 3

A mixture of 777 grams (8 mols) of isoprene in the form of a light oil isoprene fraction and 200 grams of concentrated hydrochloric acid was cooled to a temperature of 0° C., after which a rapid stream of dry hydrogen chloride was passed into the mixture until a total of 584 grams (16 mols) had been absorbed. This required 29 hours.

The crude reaction product was separated from the aqueous layer dried with anhydrous sodium sulfate, and fractionated under reduced pressure.

A total of 868 grams of isoprene dihydrochloride having the following physical properties was obtained.

Boiling point = 39° C. @ 10 mm.
Refractive index ($n\ 20°/0$) = 1.44568

The addition of hydrogen chloride to isoprene monohydrochloride to form isoprene dihydrochloride probably proceeds in the following manner, depending upon whether the primary and/or tertiary forms of isoprene monohydrochloride are formed as intermediate compounds.

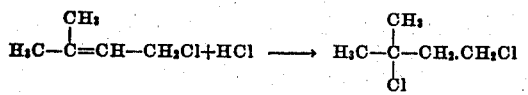

Primary isoprene monohydrochloride   isoprene dihydrochloride

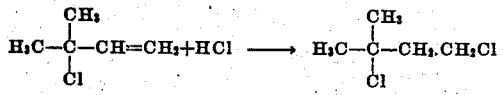

Tertiary isoprene monohydrochloride   isoprene dihydrochloride

The indicated form of isoprene dihydrochloride, namely, 2,4-dichloro-2-methyl butane, probably represents the structure of the predominating isoprene dihydrochloride formed by the methods illustrated by the foregoing experiments of at least a substantial portion of the product obtained thereby. Quantities of one or more of the following isomeric forms of isoprene dihydrochloride also may be present.

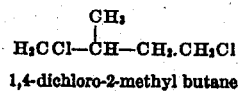

1,4-dichloro-2-methyl butane

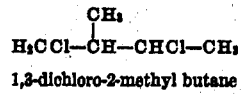

1,3-dichloro-2-methyl butane

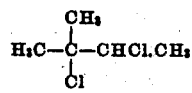

2,3-dichloro-2-methyl butane

In general, it may be said that isoprene dihydrochloride fractions containing at least a portion of 1,4-dichloro-2-methyl butane, 1,3-dichloro-2-methyl butane, and/or 2,3-dichloro-3-methyl butane may be prepared by a suitable control of the reaction conditions employed.

In general, what has been said with respect to the addition of a hydrogen halide to isoprene or to a light oil isoprene fraction to form isoprene monohydrohalide applies equally well to the addition of a hydrogen halide to isoprene monohydrohalide to form isoprene dihydrohalide and/or the addition of hydrogen halide to isoprene or to a light oil isoprene fraction to form isoprene dihydrohalide, except as hereinbefore noted.

The most important variables in the preparation of isoprene dihydrohalides, or mixtures of two or more isomeric isoprene dihydrohalides, are (1) the source of the isoprene or isoprene fraction employed, (2) the presence or absence of certain impurities in the isoprene or isoprene fraction, (3) the concentration of isoprene in the isoprene fraction employed, (4) the presence or absence of certain solvents or diluents which may exert some influence upon the direction of addition, the rate of reaction, or the extent of the reaction of the hydrogen halide with isoprene, (5) the reaction temperature, (6) the reaction pressure, (7) the contact time, (8) the presence or absence of certain catalysts or retarding agents, (9) the quantity and concentration of the hydrogen halide employed, (10) the method employed in contacting the reactants. In addition, the results obtained in conducting the reaction in the gaseous phase are frequently different from those obtained when the reaction is carried out in the liquid phase.

The structure of the products obtained frequently can be controlled by the use of certain directing catalysts, such as the organic peroxides, oxygen and the like.

In general, it may be said that an increase in the concentration of isoprene, an increase in the pressure, temperature, and time of contact, the use of relatively large quantities of the desired hydrogen halide, and the presence of certain catalysts, results in an increase in the yield of isoprene dihydrohalide obtained.

Limiting factors are the tendency of isoprene to polymerize at elevated temperatures, particularly in the presence of acids or of certain catalysts, and the tendency of certain of the products to rearrange.

When pure isoprene, or a highly concentrated isoprene fraction, is employed, there is some tendency for the isoprene to polymerize.

If desired, the concentration of isoprene may be reduced, among other ways, by the addition of certain solvents such as, for example, aromatic hydrocarbons, petroleum, naphtha, or chlorinated solvents.

When solvents are employed in the reaction, they may be mixed with either of the reactants prior to the reaction or added simultaneously with the addition of the desired hydrogen halide, as may be found convenient, or otherwise.

The addition of an inhibitor such as pyrogallol, hydroquinone, and tertiary butyl catechol also may be resorted to, either with or without the use of a solvent, or solvents, to reduce losses by polymerization.

In the case of the reaction of a hydrogen halide with isoprene in the liquid phase, however, a very desirable method of preventing excessive losses during the reaction is the use of reduced temperatures.

When the reaction is carried out in the vapor state, at elevated temperatures, fairly short reaction times are preferably employed in order to prevent undue losses due to the polymerization of isoprene.

The loss of isoprene in the form of polymers when carrying out the reaction in the vapor state at elevated temperatures also may be substantially reduced by the addition of an inert gas, or an inert solvent, or both, to one or more of the reactants.

The use of mixture of different hydrogen halides results in the production of mixed dihydrohalides of isoprene. Thus, the reaction of a mixture of hydrogen chloride and hydrogen bromide with isoprene gives a product comprising a mixture of isoprene dihydrobromide, isoprene dihydrochloride, and/or isoprene hydrochloride-hydrobromide.

The isoprene dihydrohalide may be contacted with suitable reagents to remove any excess of hydrogen halide which may be present after the reaction, if desired.

Suitable reagents for this purpose include, among others, sodium carbonate, sodium bicarbonate, calcium carbonate, lime, and similar materials, either alone or in the form of aqueous solutions or suspensions.

While light oil isoprene fractions substantially free from other diolefines are preferred for the preparation of isoprene dihydrohalides to be used for the preparation of isoprene diesters, fractions containing substantial quantities of other diolefines, such as piperylene, cyclopentadiene, and the like, also may be employed with excellent results. The use of isoprene fractions containing substantial quantities of such other diolefines usually results in the production of mixtures of isoprene dihydrohalides and the dihydrohalides of the other diolefines present. Such mixtures then may be separated, if desired, such as by fractional distillation, suitably under reduced pressures, or the mixed dihydrohalides may be used for the preparation of diesters of the type described herein, in which case the product obtained will be a mixture of isoprene diester with the diesters of the other diolefine, or diolefines, present in the starting material.

Another suitable method for the production of isoprene diesters involves the esterification of isoprene glycol. As disclosed and claimed in my copending patent application, Serial Number 399,430, filed June 23, 1941, isoprene glycol may be prepared by the hydrolysis of isoprene dihydrohalides.

As pointed out previously, the addition of a hydrogen halide to isoprene under conditions suitable for the addition of two molecules of the hydrogen halide to isoprene may result in a product containing varying proportions of two or more dihalogenated methyl butanes, the actual structure of the predominating dihydrohalide, or mixture of dihydrohalides, depending upon a large number of factors which have been discussed at some length.

In general, it may be said that the addition of a hydrogen halide to isoprene or to a light oil isoprene fraction under conditions suitable for the addition of two molecules of the hydrogen halide to isoprene normally results in the production of a mixture of isoprene dihydrohalides, although one of the dihydrohalides usually preponderates, and may comprise substantially all of the total isoprene dihydrohalide obtained as a result of the reaction. Consequently, the hydrolysis of such isoprene dihydrohalides usually results in the production of a mixture of two or more isoprene glycols.

By observing certain precautions, however, an isoprene dihydrohalide consisting predominantly, or almost entirely, of one of the isoprene dihydrohalides previously described may be obtained. In addition, mixtures of isoprene dihydrohalides may be separated into their constituents if desired, by fractional distillation, or otherwise. By the use of these procedures, the individual isoprene glycols may be obtained in a state of high purity.

However, the mixture of isoprene glycols resulting from the hydrolysis of mixed isoprene hydrohalides of the type usually obtained by the addition of two molecules of a hydrogen halide to isoprene under normal operating conditions is eminently suited for the production of isoprene diesters of the type described herein.

When a dihydrohalide of isoprene, or other suitable derivative of isoprene containing two atoms or groups capable of being hydrolyzed and replaced with an hydroxyl group (such as monohalide monoester) is treated with a hydrolyzing agent under suitable conditions, hydrolysis takes place and the substituents are replaced with hydroxyl groups, resulting in the formation of isoprene glycol.

In general, the hydrolysis of isoprene derivatives such as isoprene dihydrohalides to form isoprene glycol may be carried out in any suitable manner, and with any suitable hydrolyzing agent. However, certain precautions preferably should be observed with respect to the type and concentration of the hydrolyzing agent or agents employed, the temperature, the pressure, and the reaction time in order to secure a satisfactory yield of isoprene glycol.

Under certain operating conditions, a mixture of isoprene alcohol and isoprene glycol is obtained, indicating that one of the functional groups, such as hydrogen chloride, has split off from a portion of the isoprene derivative employed during the hydrolysis step, or that a portion of the isoprene glycol obtained has split off one molecule of water during the reaction.

In addition, a mixture of partially and completely hydrolyzed isoprene derivatives, such as a mixture of 2-hydroxy-4-chloro-2-methyl butane and isoprene glycol, may be obtained under certain operating conditions.

By employing suitable methods for the hydrolysis of isoprene dihydrochlorides or isoprene diesters, or other suitable derivatives, isoprene glycol, or a mixture of isoprene glycol with isoprene alcohol or a partial hydrolysis product such as a chloro isoprene alcohol, may be obtained. In general, it may be said that the use of drastic hydrolysis methods results in the formation of a mixture of isoprene alcohol and isoprene glycol, while the use of very mild hydrolysis methods results in the production of a mixture of isoprene glycol and a partial hydrolysis product, such as, for example, a chloroalcohol.

Alkaline hydrolyzing agents, such as sodium carbonate, sodium hydroxide, potassium hydroxide, potassium carbonate, calcium hydroxide, calcium carbonate, sodium bicarbonate, and similar alkalies, suitably in the form of aqueous solutions, may be used for the hydrolysis of isoprene dihydrohalides, or isoprene diesters, or other suitable derivatives.

Batch, multiple batch, or continuous hydrolyzing methods may be employed in the production of isoprene glycol by the hydrolysis of suitable isoprene derivatives.

The hydrolysis reaction may be carried out at atmospheric, subatmospheric, or superatmospheric pressures, as desired.

Solvents and diluents also may be added, if desired, although they are usually not necessary.

When solvents are employed during the hydrolyzing reaction, emulsifying agents may be used, if desired, in order to insure a better contact between the phases.

Emulsifying agents also may be used in the absence of solvents or diluents, if desired.

Any suitable temperature may be employed, although I prefer to use temperatures above 50° C. Excellent results usually are obtained when temperatures above 70° C. and more particularly above 80° C. are employed.

The preparation of isoprene glycol by the foregoing methods may be illustrated by the following example.

Example 4

A mixture of 282 grams (2 mols) of isoprene dihydrochloride and 1000 cc. of a 20% aqueous sodium hydroxide solution was heated to a temperature of 150° C. in an autoclave with vigorous agitation for a period of 6 hours.

Upon working up the reaction product in the usual manner, isoprene glycol having the following physical properties was obtained.

Boiling range=90–97° C. @ 8 mm.
Density ($d\ 20°/4$) =0.9448
Refractive index ($n\ 20°/d$) =1.4452

The desired diester of isoprene may be prepared (1) by converting the isoprene dihydrohalide into isoprene glycol which is then reacted with the desired acid, or its anhydride, or its acid halide, or (2) by reacting a metal derivative of isoprene glycol, such as the sodium derivative (i. e., the alcoholate) with the selected acid, or its anhydride, or its acid halide, or (3) by reacting isoprene dihydrohalide directly such as with a metal derivative of the desired acid of which potassium n-butyrate is an example. Mixtures of the isoprene diesters may be prepared by using mixtures of the desired acids, their anhydrides, or their acid halides, or combinations of the foregoing.

Isoprene glycol may be reacted with the desired acid or its anhydride, or its acid halide, by combining the reactants, preferably with the application of heat. A suitable method is to heat the reactants in a closed container provided with a reflux condenser until the reaction is substantially complete.

I prefer to dissolve the reactants in a solvent such as benzene, particularly when employing the refluxing method.

Since the reaction forms water, there is produced frequently a mixture consisting of a mixture of one or more of the reactants and water. The water formed may be removed during the esterification reaction, if desired. This may be accomplished, for instance, by permitting the reflux condensate to collect and stratify in a separate receptacle, whereupon the water layer is continuously removed and the remainder of the condensate is returned to the reaction zone.

On the other hand, the water may be removed, after the reaction has become completed, among other ways, by separating the liquid layers, whereupon the solvent and unreacted materials present may be removed from the reaction product by distillation or otherwise.

Unreacted acid present in the reaction product may be neutralized by an alkali or alkaline solution, if desired, such as sodium bicarbonate, preferably before the removal of solvent and unreacted alcohol. On the other hand, the unreacted acid may be separated from the other constituents by distillation, or otherwise.

If desired, esterification catalysts, such as sulfuric acid, hydrogen chloride phosphoric acid, and the like, may be employed, or the reaction may be carried out in the absence of a catalyst.

As previously pointed out, isoprene diesters may also be prepared by reacting a metal salt of the desired acid with isoprene dihydrohalide. Refluxing the materials over a period of several hours has been found to be particularly effective. The presence of the free acid facilitates the reaction in many cases.

After the reaction is complete, residual acid, if any, may be neutralized, if desired, after which the ester formed may be recovered in any suitable manner, for instance, by extraction and the ester may be separated in any suitable manner, such as by distillation, or by other methods, whereupon the ester may be further fractionated, if desired. Other separating and/or refining methods, as for example, the direct fractionation of the crude reaction mixture, may be used, if desired.

In many cases it will be found that the isoprene diester cannot be fractionated without decomposition. In such cases, the isoprene diester may be treated with a decolorizing agent such as activated carbon, if desired, in order to remove any color bodies or other impurities present.

Sodium, calcium, iron, lead, or other metal salts, of the desired acid may be reacted with isoprene dihydrohalide to give isoprene diesters. The reaction may be carried out in the presence or absence of the free acid or anhydride, and in the presence or absence of a solvent such as benzene. The reaction may be carried out at any suitable temperature, such as the boiling point of the mixture, and may be carried out at any suitable pressure, such as atmospheric, sub-atmospheric, or super-atmospheric pressures.

In certain cases, particularly when metal salts of certain acids are reacted with isoprene dihydrohalides to form the desired isoprene diesters, a portion of the isoprene dihydrohalide splits off one molecule of hydrogen halide, resulting in the production of a mixture of an ester of isoprene alcohol and a diester of isoprene glycol. Such mixtures may be used for various purposes without further treatment, or they may be separated by distillation, or otherwise.

The preparation of isoprene diesters may be illustrated by means of the following example.

Example 5

A mixture of 180 grams (2.2 mols) of freshly prepared anhydrous sodium sulfate and 400 grams of glacial acetic acid was heated with stirring, until a clear solution was obtained. A 141 gram (1 mol) portion of isoprene dihydrochloride (boiling point 39° C. @ 10 mm.) was added dropwise to this mixture with mild refluxing during a period of 30 minutes.

The refluxing was continued for a period of 8 hours, after which the mixture was cooled and poured into 2 liters of cold water. The ester layer was separated, dried with anhydrous sodium sulfate, and fractionated under reduced pressure.

A small quantity of isoprene acetate was obtained, after which the isoprene diacetate was collected at a higher temperature. The isoprene diacetate was a colorless, limpid liquid with a penetrating, fruity odor. It had the following physical properties.

Boiling range=80–85° C. @ 4 mm.
Density ($d$ 20°/4)=1.0023
Refractive index ($n$ 20/D)=1.42660

The properties of the isoprene diesters of the type described make them excellent solvents or plasticizers for paints, lacquers, varnishes, enamels, and similar coating compositions. They are also particularly valuable as intermediates in chemical synthesis. In addition, they are excellent plasticizing agents for a wide variety of resins and plastics. In general, the exceptionally pleasant odor of these materials recommend them for many uses to which materials of this character are put, such as in perfumes, soaps, pharmaceutical preparations, et cetera.

The use of these derivatives as plasticizing agents for lacquers is illustrated by the following examples.

*Example 6*

A base mixture of the following components

| | Parts |
|---|---|
| Ester gum | 2.5 |
| Nitro cellulose | 5 |
| Isoprene diacetate | 2.5 | is thoroughly incorporated in 40 parts of the following solvent mixture

| | Parts |
|---|---|
| Amyl alcohol | 10 |
| Isopropyl acetate | 13 |
| Anhydrous ethyl alcohol | 3 |
| Toluol | 34 |
| Saturated hydrocarbon fraction obtained in the pyrolysis of petroleum oil (B. P. 100–120° C.) known commercially as troluol | 20 |
| Isoprene n-butyrate | 20 |

A clear lacquer is obtained which when applied to the surface of tin plated panels and permitted to dry overnight, produces a light colored, flexible, adherent coating.

Ethyl cellulose might be substituted for nitrocellulose in the foregoing example.

*Example 7*

A base mixture of the following components

| | Parts |
|---|---|
| Cellulose acetate | 6.5 |
| Isoprene diacetate | 0.5 | is thoroughly incorporated in 93 parts of the following solvent mixture.

| | Parts |
|---|---|
| Acetone | 50 |
| Ethylene glycol monoethyl ether | 20 |
| Toluene | 15 |
| Isoprene isobutyrate | 20 |

A clear lacquer is obtained which when applied to the surface of metallic panels and permitted to dry overnight produces a colorless, flexible, adherent coating.

The invention also comprehends the preparation of mixed esters, such as by the reaction of a mixture of acetic and propionic acids with isoprene glycol, or otherwise.

The term "acid compound" embraces organic carboxylic acids in general, as well as substituted organic carboxylic acids, their salts, anhydrides, and acid halides. The term "carboxylic acid" includes the anhydride, or mixtures of the acid and anhydride. The term "hydrogen halide" embraces hydrogen chloride, bromide, iodide and fluoride. The term "isoprene dihydrohalide" embraces the di-substituted isoprene derivatives of these four hydrogen halides, or mixtures thereof. The term "isoprene" includes pure isoprene, technical or commercial grades thereof when produced, isoprene solutions, and hydrocarbon fractions containing any quantity of isoprene regardless of source. The term "isoprene derivative" is intended to embrace isoprene glycol, the metal derivatives of isoprene glycol (i. e., the dialcoholate), the dihydrohalides of isoprene, and the monohalogen-monohydroxy derivative of isoprene, or other equivalent derivative for the purposes herein described. The term "metal acid derivative" includes the potassium, sodium, calcium, iron, lead, and other such salts of organic acids. Additionally, the term "esterification catalyst" includes such compounds as sulfuric acid, phosphoric acid, anhydrous hydrogen chloride, and the like.

While reagents and procedures of a particular nature have been specifically described, it is to be understood that these are by way of illustration. Therefore, changes, omissions, additions, substitutions and/or modifications might be made within the scope of the claims without departing from the spirit of the invention which is intended to be limited only as required by prior art.

I claim:

1. A composition of matter comprising a cellulosic derivative selected from the group consisting of cellulosic ethers and cellulosic esters and a plasticizer containing a diester having the following structure:

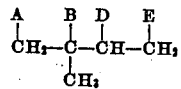

in which one of a pair consisting of A and B is an —OOC—$R_1$ group and one of a pair consisting of D and E is an —OOC—$R_2$ group, in which $R_1$ and $R_2$ each represents one of a group consisting of hydrogen, alkyl, aryl, alkyl-aryl, aryl-alkyl, hydroxy alkyl, haloalkyl, aminoalkyl, and hydroxy aryl groups, the remaining substituents being hydrogen atoms.

2. A composition of matter comprising a cellulosic derivative selected from the group consisting of cellulosic ethers and cellulosic esters and a plasticizer containing a diester having the following structure:

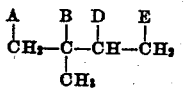

in which one of a pair consisting of A and B is an —OOC—R group and one of a pair consisting of D and E is an —OOC—R group, in which R is an alkyl group, the remaining substituents being hydrogen atoms.

3. A composition of matter comprising a cellulosic derivative selected from the group consisting of cellulosic ethers and cellulosic esters and a plasticizer containing a diester having the following structure:

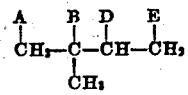

in which one of a pair consisting of A and B is an —OOC—R group and one of a pair consisting of D and E is an —OOC—R group, in which R is an aryl group, the remaining substituents being hydrogen atoms.

4. A composition of matter comprising a cellulosic derivative selected from the group consisting of cellulosic ethers and cellulosic esters and a plasticizer containing a carboxylic acid diester of dihydroxy methyl butane.

5. A composition of matter comprising a cellulosic derivative selected from the group consisting of cellulosic ethers and cellulosic esters and a plasticizer containing a diacetate of dihydroxy methyl butane.

6. A composition of matter comprising a cellulosic derivative selected from the group consisting of cellulosic ethers and cellulosic esters and a plasticizer containing a diacetate of 2,4,dihydroxy-2-methyl butane.

7. The composition of claim 1 in which the cellulosic derivative is nitrocellulose.

8. The composition of claim 1 in which the cellulosic derivative is ethyl cellulose.

9. The composition of claim 1 in which the cellulosic derivative is cellulose acetate.

10. A composition of matter comprising nitrocellulose and a diester having the following structure:

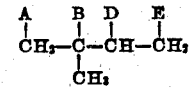

in which one of a pair consisting of A and B is an —OOC—R group and one of a pair consisting of D and E is an —OOC—R group, in which R is an alkyl group, the remaining substituents being hydrogen atoms.

11. A composition of matter comprising ethyl cellulose and a diester having the following structure:

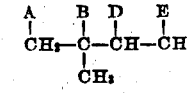

in which one of a pair consisting of A and B is an —OOC—R group and one of a pair consisting of D and E is an —OOC—R group, in which R is an alkyl group, the remaining substituents being hydrogen atoms.

12. A composition of matter comprising cellulose acetate and a diester having the following structure:

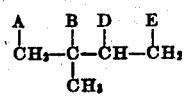

in which one of a pair consisting of A and B is an —OOC—R group and one of a pair consisting of D and E is an —OOC—R group, in which R is an alkyl group, the remaining substituents being hydrogen atoms.

13. A composition of matter comprising nitrocellulose and a diester having the following structure:

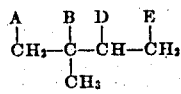

in which one of a pair consisting of A and B is an —OOC—R group and one of a pair consisting of D and E is an —OOC—R group, in which R is an aryl group, the remaining substituents being hydrogen atoms.

14. A composition of matter comprising ethyl cellulose and a diester having the following structure:

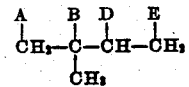

in which one of a pair consisting of A and B is an —OOC—R group and one of a pair consisting of D and E is an —OOC—R group, in which R is an aryl group, the remaining substituents being hydrogen atoms.

15. A composition of matter comprising cellulose acetate and a diester having the following structure:

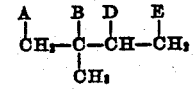

in which one of a pair consisting of A and B is an —OOC—R group and one of a pair consisting of D and E is an —OOC—R group, in which R is an aryl group, the remaining substituents being hydrogen atoms.

16. A composition of matter comprising nitrocellulose and a diacetate of 2,4,dihydroxy-2-methyl butane.

17. A composition of matter comprising ethyl cellulose and a diacetate of 2,4,dihydroxy-2-methyl butane.

18. A composition of matter comprising cellulose acetate and a diacetate of 2,4,dihydroxy-2-methyl butane.

FRANK J. SODAY.